May 19, 1936. C. M. STEELE 2,041,619
CLAY WORKING MACHINE
Filed April 20, 1935 2 Sheets-Sheet 1
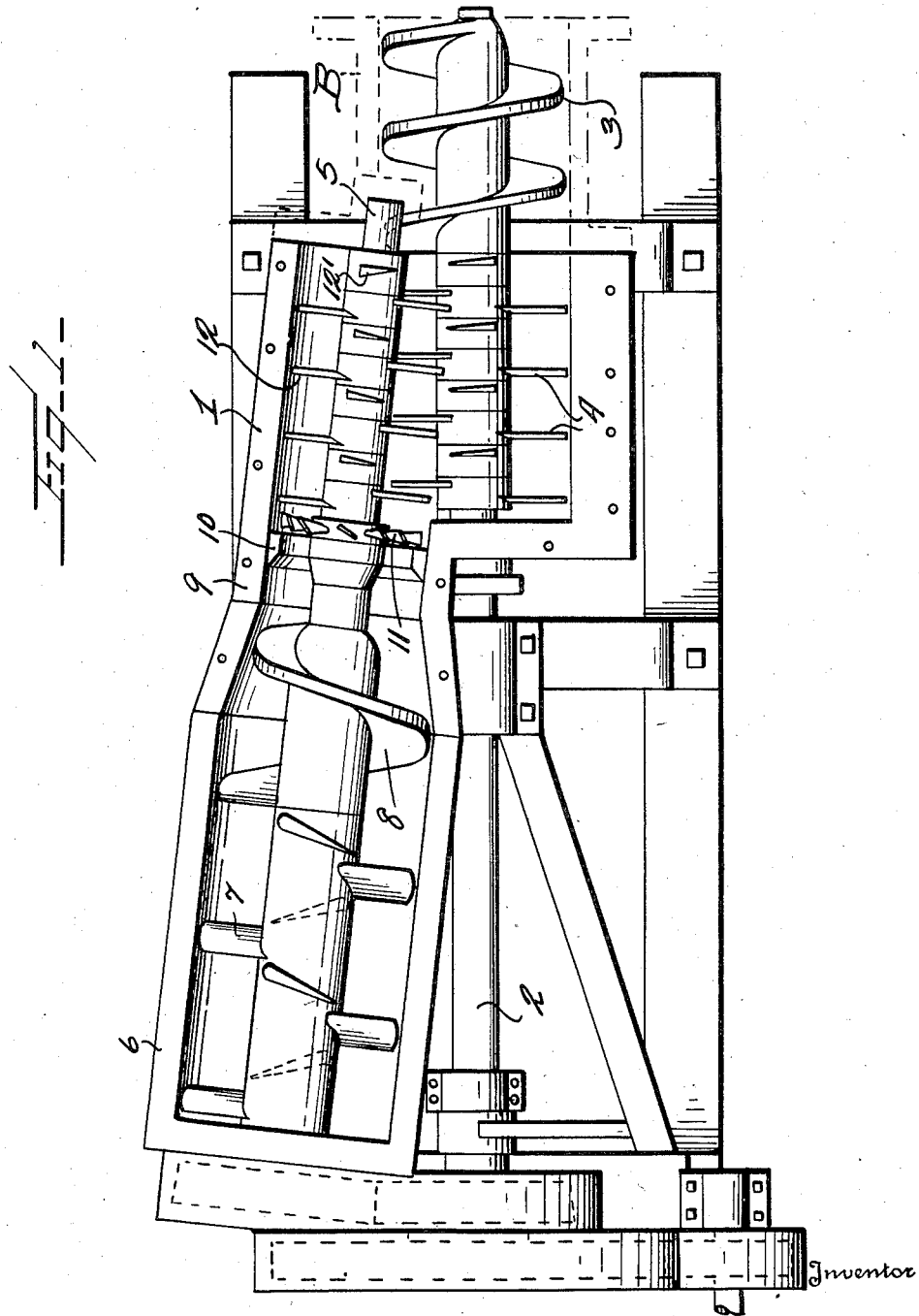
Inventor
C. M. Steele
By Watson E. Coleman
Attorney May 19, 1936.  C. M. STEELE  2,041,619
CLAY WORKING MACHINE
Filed April 20, 1935   2 Sheets-Sheet 2
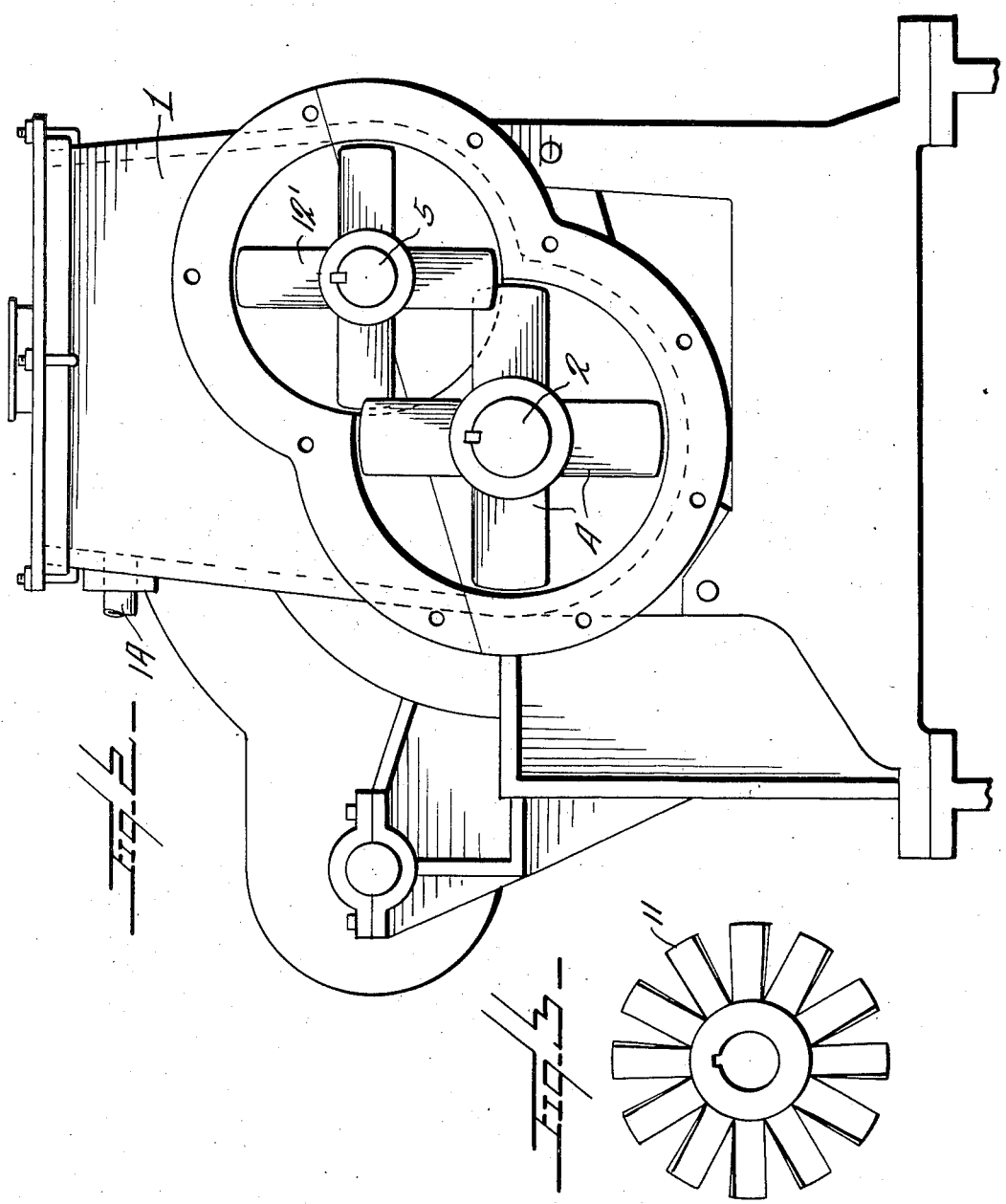
Inventor
C. M. Steele
By Watson E. Coleman
Attorney Patented May 19, 1936

2,041,619

UNITED STATES PATENT OFFICE 2,041,619

CLAY WORKING MACHINE

Clarence M. Steele, Statesville, N. C.

Application April 20, 1935, Serial No. 17,501

8 Claims. (Cl. 25—14)

This invention relates to clay working machines and has relation more particularly to a machine of this kind for working clay and other material by what is known as a stiff mud process.

It is an object of the invention to provide a machine of this kind wherein the clay or other plastic material is treated prior to and during its passage through the extruding chamber and dies, such material being shredded and disintegrated in a manner to facilitate the removal of the air therefrom so that the resultant product possesses a maximum of strength.

Another object of the invention is to provide an apparatus of this kind including an enclosed chamber in which works a feeding shaft and from which leads an extrusion shaft, said shafts being provided with interworking blades.

The invention also comprises a method of treating clay or kindred plastic material which consists in the introduction of such material into a double shaft enclosed chamber in which the material is transferred from one shaft to the other, one of said shafts being an infeeding shaft and the other an extrusion shaft and in exhausting the air from within said chamber.

The invention consists in the details of construction and in the combination and arrangement of the several parts of my improved clay working machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a machine constructed in accordance with an embodiment of my invention, certain of the parts being omitted;

Figure 2 is a view in front elevation at the extrusion end of the machine, the dies being omitted;

Figure 3 is an elevational view of the shredder member unapplied.

As disclosed in the accompanying drawings, 1 denotes an enclosed chamber which may be termed either a double shaft chamber or a vacuum chamber. Extending into this chamber 1 is a main shaft 2 which is also of a length to extend within a barrel B indicated by broken lines in Figure 1 and in which rotates the extrusion auger 3 mounted upon the shaft 2 for rotation therewith.

The lower portion of the chamber 1 has working therein the blades 4 carried by the shaft 2 and which blades are spirally arranged around the shaft along that portion thereof within the chamber 1.

Extending within the chamber 1 to one side of the shaft 2 and inclined downwardly and forwardly toward the outer end of the chamber 1 is a feed shaft 5. This shaft 5 extends rearwardly into the feeding hopper or pugging mill 6. The portion of the shaft 5 within the mill 6 carries the spirally arranged pugging knives 7 which are positioned in advance of the expressing auger 8 carried by the shaft 5 immediately in advance of the chamber 1. There is positioned, however, within the entrance 9 to the chamber 1 a sectional sealing inlet die 10 through which the material is forced into the chamber 1. The shaft 5 within the chamber 1 and immediately adjacent to the sealing die 10 carries a multiple blade shredder 11 and also carried by the shaft 5 within the chamber 1 between said shredder 11 and the discharge end of the chamber are the blades 12 spaced apart lengthwise of the shaft 5 and also spirally arranged. These blades 12 interwork with the blades 4 and due to the inclination of the shaft 5 it is to be particularly noted that this interworking of the blades 4 and 12 gradually increases in depth from the pug mill end of the chamber 1 to the opposite end thereof. This assures a most effective disintegrating action upon the clay or kindred material within the chamber 1 and also further assures a more effective transfer of the material from the infeeding shaft 5 to the extrusion auger 3.

It is to be particularly noted that at the outer end of the chamber 1 the blades 12' are reversed in pitch to the blades 12. This is of particular importance as it prevents packing of the clay or other material at the outer or dead end of the feeding shaft 5.

The upper portion of the chamber 1 has in communication therewith a pipe line 14 leading to a suitable vacuum pump whereby air within the chamber 1 may be exhausted and thereby materially increasing the strength of the product. It is also believed to be obvious that the action upon the material within the chamber 1 is such to provide a most effective shredding of such material to expose all portions thereof to vacuum.

The blades 12 and 12' also provide effective means to force the material into the extruding auger 3 and also to prevent the material within the chamber from bridging therein and choking.

The shafts 2 and 5 are driven in a conventional manner by suitably arranged gearing or otherwise as may be preferred.

It has been found in practice that by having the shafts 2 and 5 angularly related as hereinbefore set forth wider spacing is provided at the rear of the machine to provide for larger and stronger operating gears than would otherwise be possible.

It is also to be noted that the angular relation of the shafts 2 and 5 permits the blades 4 and 12 to interwork in different planes thereby giving a mashing as well as a cutting effect upon the material, and it is to be especially noted that the elevation of the shaft 5 is highly important as it assures the transfer of the clay from the feeding shaft to the extruding shaft by gravity as well as the interworking action of the blades 4 and 12. This elevation of the shaft 5 is preferably forty degrees although it may be varied for different clays. It is also to be particularly noted and mentioned that the transfer of the clay occurs while the clay is being disintegrated.

It is believed to be clear from the accompanying drawings that the enclosed chamber 1 is divided substantially horizontally into two sections, the line of separation passing through the sealing die 10 and above the packing gland required for the extruding shaft whereby is eliminated the requirement for any joints in the gland.

From the foregoing description it is thought to be obvious that a clay working machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A machine of the class described comprising a chamber, an extrusion shaft working therein, an infeed shaft also working in the chamber, and interworking cutting and feeding blades carried by said shafts at spaced points therealong, the blades on the infeed shaft at the delivery end of the chamber being on a pitch reversed to the pitch of the remaining blades on said shaft to prevent packing.

2. A machine of the class described comprising a chamber, an extrusion shaft working in the chamber and operating an extruding auger, means working in the chamber independently of the extrusion shaft for forcing the material to the extruding auger, and means carried by the extrusion shaft, to prevent the material bridging at the dead end of the chamber.

3. A machine of the class described comprising a chamber, an extrusion shaft working in the chamber and operating an extruding auger, means working in the chamber independently of the extrusion shaft for forcing the material to the extruding auger, and means carried by the extrusion shaft to prevent the material bridging at the dead end of the chamber and also forcing the material to the extruding auger.

4. A machine of the class described comprising a chamber, an extrusion shaft working therein, an infeed shaft also working in the chamber, said infeed shaft being above and inclined toward the extrusion shaft, and means carried by the shafts for both mashing and cutting the material as delivered by the infeed shaft to the extrusion shaft.

5. A machine of the class described comprising a chamber, an extrusion shaft working therein, an infeed shaft also working in the chamber, said infeed shaft being above and inclined toward the extrusion shaft, and interworking blades carried by both of the shafts at points spaced therealong and constructed and arranged for both mashing and cutting the material as delivered by the infeed shaft to the extrusion shaft.

6. A machine of the class described comprising a chamber, an extrusion shaft working therein, an infeed shaft also working in the chamber, said infeed shaft being above and inclined toward the extrusion shaft, interworking blades carried by both of the shafts at points spaced therealong and constructed and arranged for both mashing and cutting the material as delivered by the infeed shaft to the extrusion shaft, means for sealing the entrance to the chamber as the material passes therein, and means for exhausting the air from within the chamber.

7. A machine of the class described comprising a chamber, an extrusion shaft working therein, an infeed shaft also working in the chamber, said infeed shaft being above and inclined toward the extrusion shaft, interworking blades carried by both of the shafts at points spaced therealong and constructed and arranged for both mashing and cutting the material as delivered by the infeed shaft to the extrusion shaft, means for sealing the entrance to the chamber as the material passes therein, means for exhausting the air from within the chamber, and a multiple blade shredder carried by the infeed shaft within the chamber and immediately adjacent to the sealing means.

8. A machine of the class described comprising a chamber, an extrusion shaft working therein, an infeed shaft also working in the chamber, said infeed shaft being above and inclined toward the extrusion shaft, interworking blades carried by both of the shafts at points spaced therealong and constructed and arranged for both mashing and cutting the material as delivered by the infeed shaft to the extrusion shaft, and a sealing inlet die fitted within the entrance to the chamber and through which the material is forced into the chamber, said die surrounding the shaft and free of contact therewith.

CLARENCE M. STEELE.